US011523166B1

(12) United States Patent
Tu et al.

(10) Patent No.: US 11,523,166 B1
(45) Date of Patent: Dec. 6, 2022

(54) CONTROLLING INTERFACE OF A MULTI-INPUT MODALITY DEVICE

(71) Applicant: Amazon Technologies, Inc., Seattle, WA (US)

(72) Inventors: Xin Tu, Redwood City, CA (US); Monica Leigh Farrar Miller, Lake Forest Park, WA (US); Jimin Kim, Sunnyvale, CA (US); Srikanth Ramakrishna, San Jose, CA (US); Robert Neil Gaa Torres, El Dorado Hills, CA (US); Yonius Saritoh, Irvine, CA (US); Matthew T. Svihovec, Milpitas, CA (US); Shikhar Singh, San Jose, CA (US); Lakshminarayanan Angamuthu, Georgetown, TX (US); Vinay Nadagoud, San Jose, CA (US); Yan Wang, San Jose, CA (US); Pradeep Rajvin Dinakar, Fremont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/106,560

(22) Filed: Nov. 30, 2020

(51) Int. Cl.
*G06F 3/0482* (2013.01)
*H04N 21/422* (2011.01)
*G06F 3/04883* (2022.01)
*H04N 21/485* (2011.01)

(52) U.S. Cl.
CPC ..... *H04N 21/42204* (2013.01); *G06F 3/0482* (2013.01); *G06F 3/04883* (2013.01); *H04N 21/485* (2013.01)

(58) Field of Classification Search
CPC ............ H04N 21/42204; H04N 21/485; G06F 3/0482; G06F 3/04883
See application file for complete search history.

(56) References Cited

U.S. PATENT DOCUMENTS

| | | | |
|---|---|---|---|
| 2013/0027613 A1* | 1/2013 | Kim ................. | H04N 21/43637 348/563 |
| 2013/0080973 A1* | 3/2013 | Nezu ..................... | G06F 3/0488 715/810 |
| 2013/0093685 A1* | 4/2013 | Kalu ................... | G06F 3/04886 345/173 |

(Continued)

*Primary Examiner* — Phenuel S Salomon
(74) *Attorney, Agent, or Firm* — Kilpatrick Townsend & Stockton LLP

(57) ABSTRACT

Techniques for controlling an interface of a multi-input modality device are described. In an example, a device presents a menu on a display in a first input modality mode of the device. The menu includes graphical user interface (GUI) elements. The first input modality mode corresponds to a first type of input modality. The device receives first input corresponding to a second type of input modality. The device presents the menu on the display in a second input modality mode of the device that corresponds to the second type of input modality. The first input modality mode and the second input modality mode are exclusive to each other and each provide a different menu navigation control. The device changes a presentation of a visual indicator at a first location associated with a first GUI element of the GUI elements in the menu based on the second input modality mode.

20 Claims, 15 Drawing Sheets

(56) References Cited

U.S. PATENT DOCUMENTS

| | | | |
|---|---|---|---|
| 2015/0082253 A1* | 3/2015 | DeRose | G06F 3/04815 715/849 |
| 2015/0175397 A1* | 6/2015 | Lynn | G06F 3/04886 345/173 |
| 2015/0193119 A1* | 7/2015 | Chai | G06F 3/04817 715/835 |
| 2015/0370920 A1* | 12/2015 | Van Os | G06F 3/0482 707/767 |
| 2018/0098109 A1* | 4/2018 | Seo | H04N 21/42222 |
| 2020/0145726 A1* | 5/2020 | Ciuca | H04N 21/4821 |
| 2020/0220914 A1* | 7/2020 | Carrigan | H04L 65/1094 |
| 2020/0333925 A1* | 10/2020 | Jung | G06F 3/0482 |

* cited by examiner

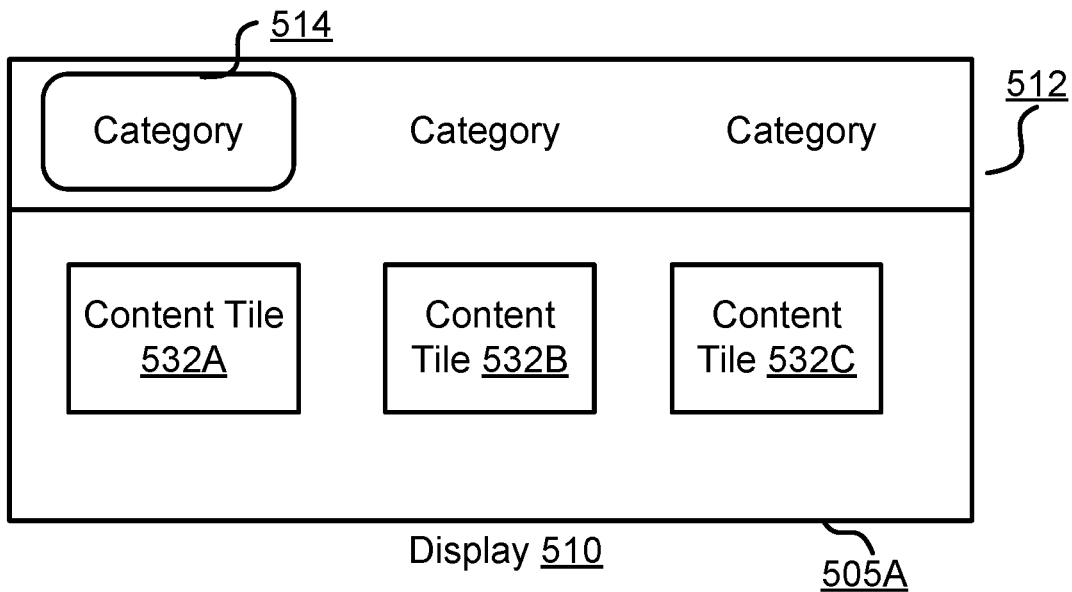
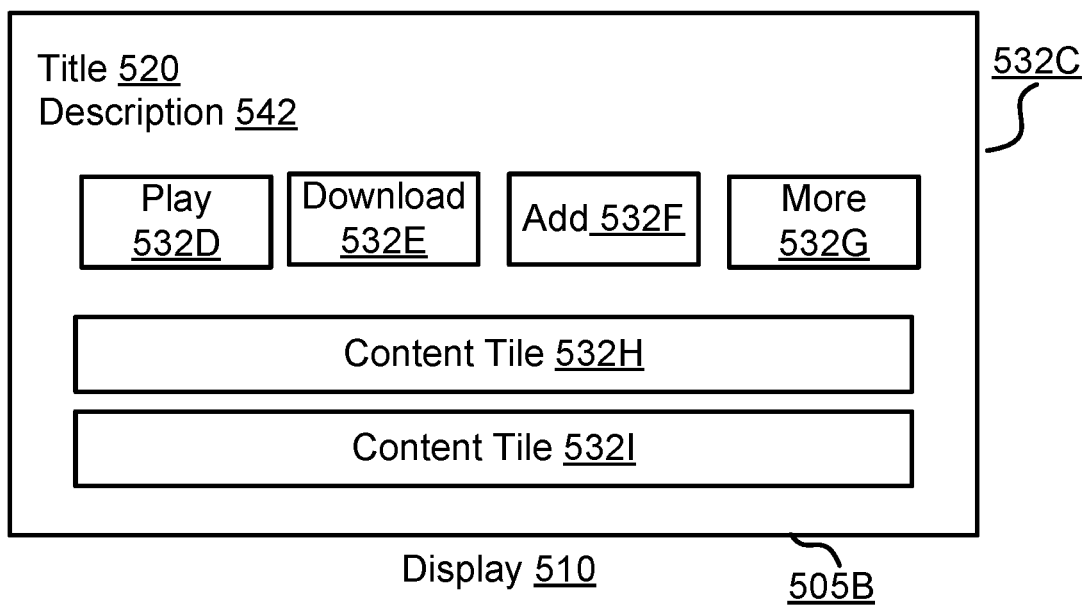
FIG. 5

CONTROLLING INTERFACE OF A MULTI-INPUT MODALITY DEVICE

BACKGROUND

Different devices are available for presenting content to users. The content can be organized in a menu of graphical user interface (GUI) elements. A user selection in the menu results in displaying information about particular content. For some devices, a user selection can also result in playing the particular content.

BRIEF DESCRIPTION OF THE DRAWINGS

Various embodiments in accordance with the present disclosure will be described with reference to the drawings, in which:

FIG. 5 illustrates an example of navigation in a touchscreen mode, according to embodiments of the present disclosure;

DETAILED DESCRIPTION

Figure 1:
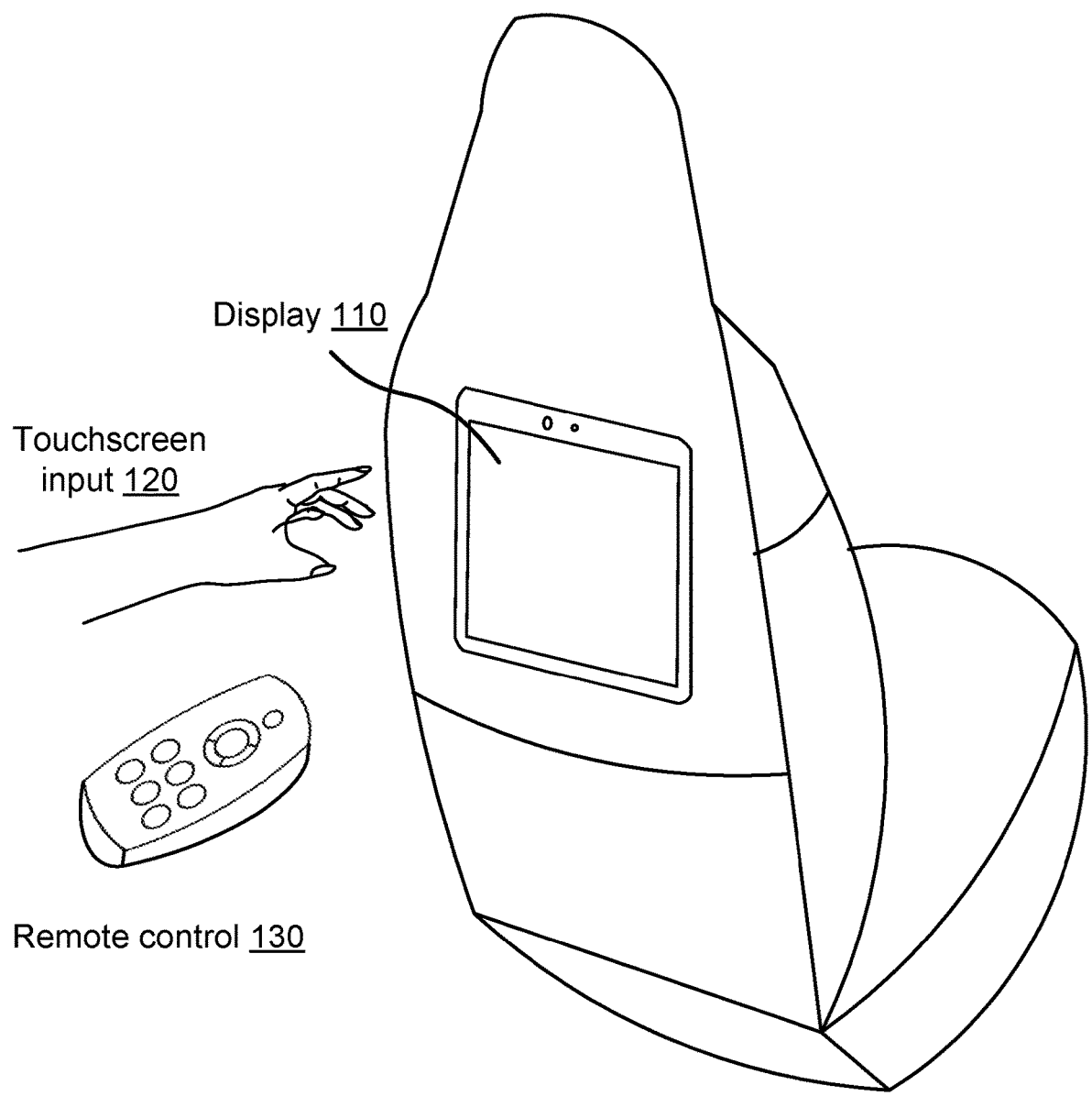
FIG. 1 illustrates an example of a system for controlling a display of a multi-input modality device, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, controlling an interface of a multi-input modality device that includes or is coupled with a display. Some of the input modalities are direct, where a user input can be directly correlated with a graphical user interface (GUI) location on the display. Other input modalities are indirect, where a user input may not be directly correlated with a GUI location. Depending on the type of input modality (direct or indirect), a visual indicator (e.g., type of a cursor) may be presented to indicate a GUI location. The navigation flow between GUI elements can also be controlled depending on the input modality type. For instance, a device supports touchscreen input, input via a display remote control, or speech input. Touchscreen modality is an example of a direct input modality, whereas remote control modality and speech modality are examples of an indirect input modality. When the device is operating in a remote control mode or speech mode, a visual indicator is presented at a first GUI location associated with a first GUI element to indicate that a cursor is at the first GUI element. To select a second GUI element, a first user input may be received to navigate the cursor to a second GUI location of the second GUI element, resulting in the visual indicator being presented at the second GUI location, and a second user input may be received to select the second GUI element when the visual indicator is at the second GUI location. In comparison, while operating in a touchscreen mode, the visual indicator may no longer be used and the navigation between GUI elements becomes more fluid. For example, touchscreen input can be received, whereby, for instance, a navigational scroll is performed in response to a touchscreen gesture and a GUI element selection is performed in response to a touchscreen tap on the GUI element.

To illustrate, consider an example of a television (TV). The TV includes a touchscreen display and supports multiple input modalities, such as TV remote control input modality and touchscreen input modality. Initially, while in a remote control mode, the TV presents a menu including GUI elements on the touchscreen display. A visual indicator is presented at a first location associated with a first GUI element. For example, the menu corresponds to a library of movies available for viewing. The visual indicator (e.g., a highlight) is presented on a first movie of a top row of the library to indicate a cursor is on the first movie. The TV receives navigation data corresponding to a selection of a navigation button (e.g., a right button) of the TV remote control. The TV presents the visual indicator at a second location associated with a second GUI element that is adjacent to the first GUI element to indicate the cursor is on the second GUI element in response to the selection of the navigation button. At some time, the TV receives a first touchscreen input at the touchscreen display and switches to the touchscreen mode. While in the touchscreen mode, the TV removes the presentation of the visual indicator from the menu. The TV receives a second touchscreen input at the touchscreen display corresponding to a menu action that includes at least one of a menu scrolling or a menu selection. For example, the second touchscreen input includes selecting a movie in the library. The TV initiates the menu action and opens a display page for the selected movie. The touchscreen mode also includes an overlay window of at least one GUI button corresponding to at least one button of the TV remote control. The overlay window is removed when the TV is in the remote control mode.

Embodiments of the present disclosure provide several technical advantages over conventional display devices. For instance, the embodiments provide a device capable of switching between input modalities and dynamically adjusting the navigation controls of a GUI and the presentation of the navigation controls based on the input modality type. Because dynamic adjustments are performed, the device provides an improved GUI experience.

FIG. 1 illustrates an example of a system for controlling a display 110 of a multi-input modality device, according to embodiments of the present disclosure. The system includes the display 110 and a remote control 130 that includes navigation buttons. The display 110 is a touchscreen display. The remote control 130 may be referred to as a display remote control to indicate that controls can be provided therefrom to a graphical user interface presented on the display. The system is capable of supporting various computing services including, for instance, display operations. In particular, the system includes one or more processors, one or more memories storing computer-readable instructions, one or more network interfaces, and/or other computing components.

In an example, the multi-input modality device may be a TV, such as a TV on a back of a seat in a car. The TV includes the display 110 and supports multiple input modalities, such as a display remote control input modality and a touchscreen input modality. Initially, while in a remote control mode, the TV presents a menu in a GUI on the display 110, where the menu includes GUI elements. In this mode, user navigation input via the remote control 130 cannot be directly translated into a location on the display because this type of input modality is indicted. As such, a cursor is needed such that the TV can indicate the display location to a user to assist with the user navigation input. Different possibilities exist to present the cursor. Generally, a visual indicator is used to present the cursor and can include any of highlights, bounding boxes, lines, arrows, and the like. In an example, a visual indicator is presented at a first location associated with a first GUI element. For example, the menu corresponds to a library of movies available for viewing. The visual indicator (e.g., a highlight) is presented on a first movie of a top row of the library to indicate a cursor is on the first movie. The TV receives navigation data corresponding to a selection of a navigation button (e.g., a right button) of the remote control 130. The TV presents the visual indicator at a second location associated with a second GUI element that is adjacent to the first GUI element to indicate the cursor is on the second GUI element in response to the selection of the navigation button.

At some time, the TV receives a first touchscreen input 120 at the display 110 and switches to the touchscreen mode, which is exclusive from the remote control mode (e.g., the TV can be controlled in the touchscreen mode or the remote control mode at any point in time but not simultaneously in both modes). While in the touchscreen mode, the TV removes the presentation of the visual indicator from the menu. Instead, touch locations and type of touches (e.g., taps, gestures) on the display 110 can be detected by the TV as a type of direct modality. Given the touch locations and touch types, controls over the menu can be effectuated without the use of a cursor or the cursor's presentation as a visual indicator. In an example, the TV receives a second touchscreen input 120 at the display 110 corresponding to a menu action that includes at least one of a menu scrolling or a menu selection. For example, the second touchscreen input 120 includes selecting a movie in the library. The TV initiates the menu action and opens a content tile page for the selected movie. The touchscreen mode also includes an overlay window of at least one GUI button corresponding to at least one button of the remote control 130. The overlay window is removed when the TV is in the remote control mode.

The display 110 may additionally support speech input. In one example, the control of the menu of GUI elements in the speech input mode is similar to the control of the menu in the remote control mode. The TV presents the visual indicator at a location associated with a GUI element. The speech input can include navigation and selection data for moving between and selecting GUI elements. In another example, the control of the menu depends on whether the speech is near-field speech or far-field speech. For near-end speech, the control is similar to that in the remote control mode. For far-field speech, the control may, but need not, involve a visual indicator. For instance, the menu can be organized as a numbered list, where a GUI element therefrom can be selected based on speech input indicating the corresponding number of the GUI element in the numbered list.

Figure 2:
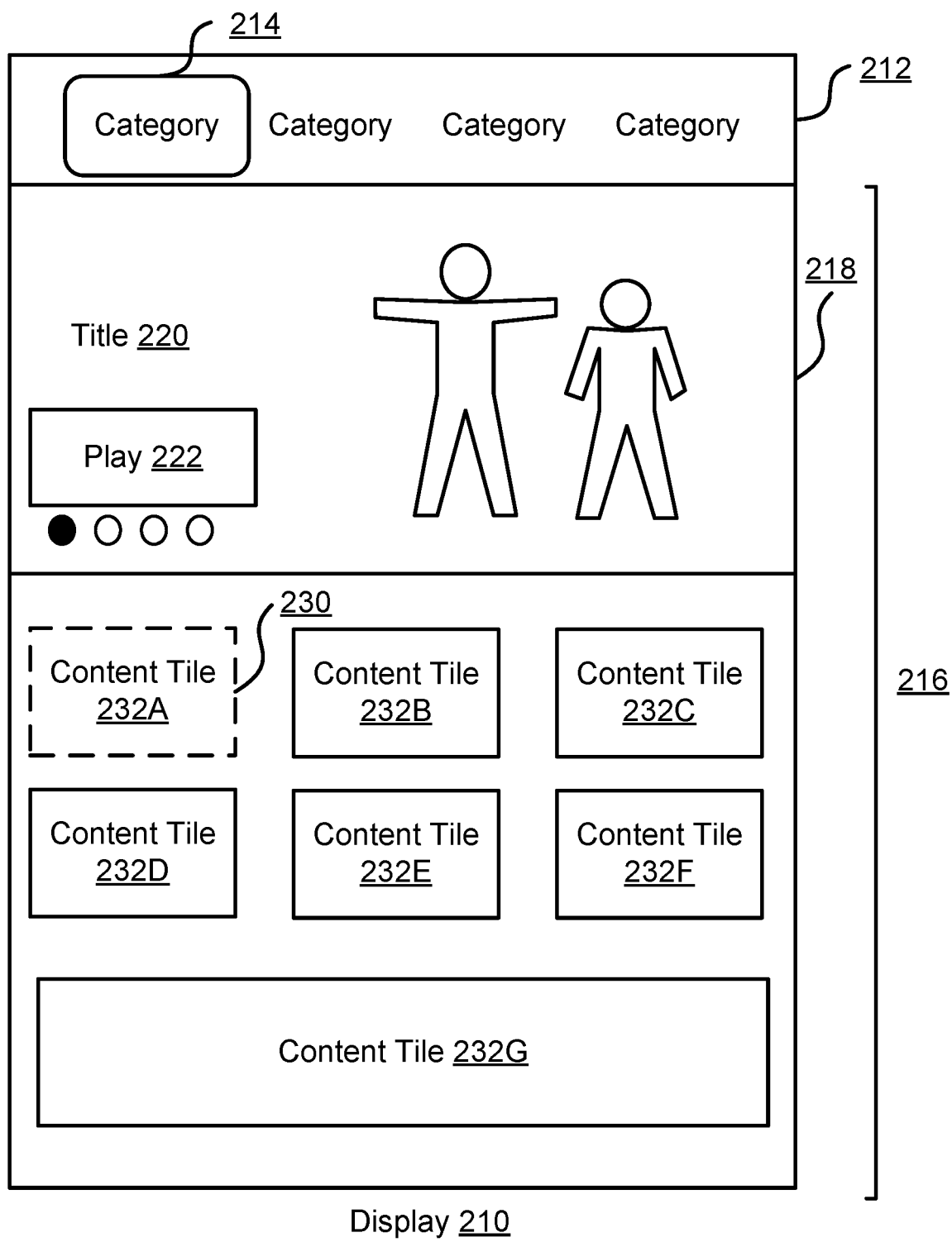
FIG. 2 illustrates an example of a menu of a display, according to embodiments of the present disclosure.

FIG. 2 illustrates an example of a menu of a display 210 of a multi-input modality device, according to embodiments of the present disclosure. The display 210 is an example of the display 110 of FIG. 1, where the menu can be controlled via a remote control, touchscreen input, or speech input. The menu includes a tab portion 212 and a body portion 216, each of which include GUI elements. The tab portion 212 includes one or more category identifiers corresponding to different menus (or, similarly, menu pages) of the multi-input modality device. For example, the category identifiers can correspond to categories of "Home" for a central menu, "Library" for a menu of movies or TV shows, "Live" for a menu of currently streaming shows and movies, and "Apps" for a menu of available applications. Each category identifier corresponds to a GUI element. A visual indicator 214 indicates which category identifier in the tab portion 212 is selected.

In an example, the body portion 216 includes a preview portion 218. The preview portion 218 provides a preview of featured content. A title 220 of the featured content is displayed along with an image (e.g., thumbnail) of the featured content. The preview portion 218 additionally includes GUI element of a play button 222, which when selected, opens a content tile page for the featured content. The preview portion 218 may include multiple featured contents to be cycled through, as indicated by the circles beneath the play button 222.

The body portion 216 of the display 210 additionally includes content tiles 232A-G. Each of the content tiles 232A-G corresponds to a GUI element. The content tiles 232A-G may correspond to movies, TV shows, advertisements, input options (e.g., HDMI, USB, disk, etc.), and the like. In an example, the content tiles 232A-G are arranged in rows and columns making up a grid, but other examples may include alternative arrangements of the content tiles 232A-G.

In a remote control mode corresponding to a remote control input modality (and, similarly, a speech input mode), the menu of the display 210 also includes a visual indicator 230. The visual indicator 230 is presented at a location of the content tile 232A to indicate that a cursor is on the content tile 232A. The visual indicator 230 may be removed or presented differently in a touchscreen mode corresponding to a touchscreen input modality.

Figure 3:
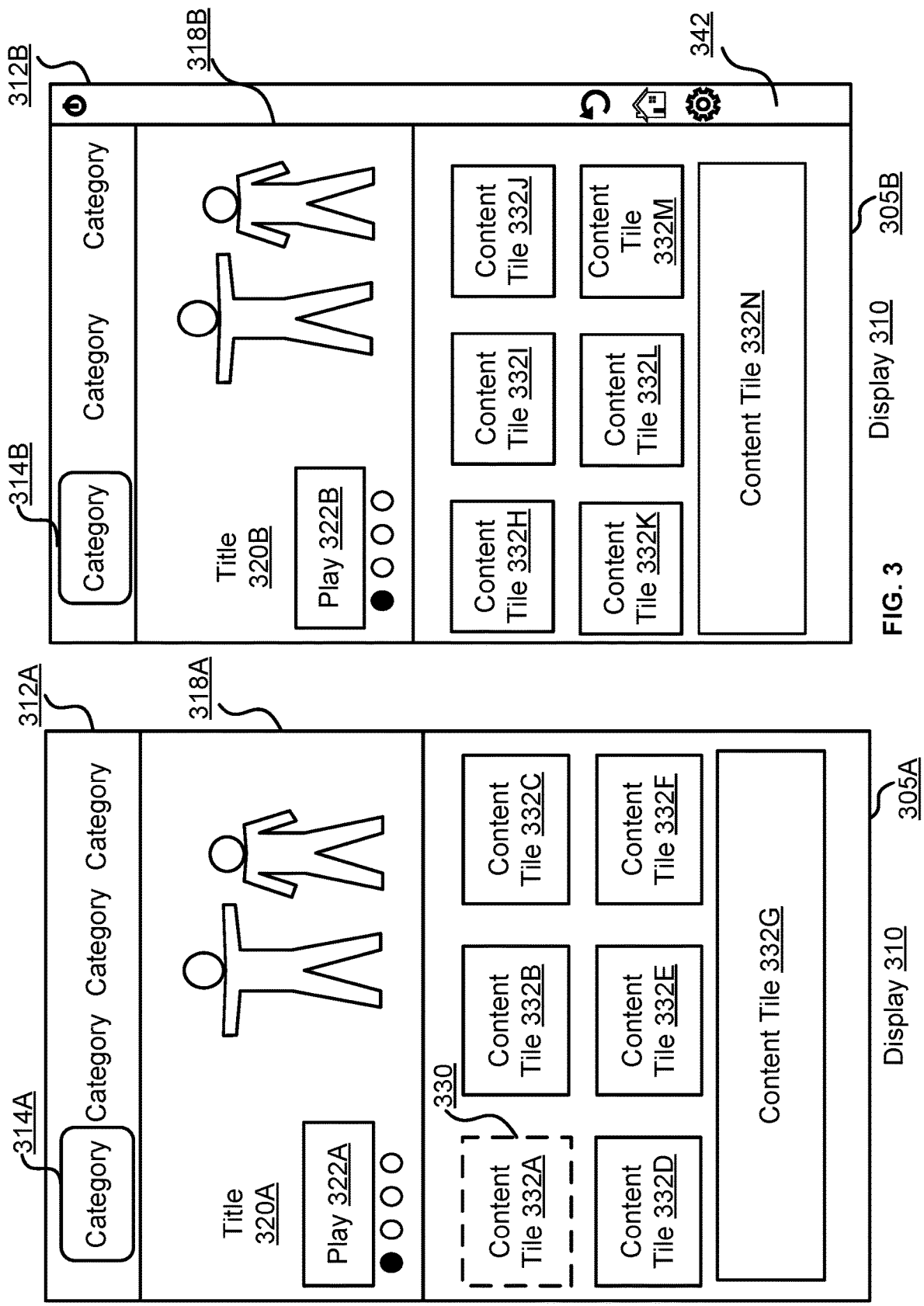
FIG. 3 illustrates an example of a visual indicator in different input modalities, according to embodiments of the present disclosure.

FIG. 3 illustrates an example of a presentation of a visual indicator in different input modalities, according to embodiments of the present disclosure. The menu of a display 310 is presented and controlled in a remote control mode where a device receives display remote control input, and the menu of display 310 is presented and controlled in to a touchscreen mode where the device receives touchscreen input. The tab portions 312A-B, preview portions 318A-B, titles 320A-B, and play buttons 322A-B are examples of the corresponding components in FIG. 2. The menu in the remote control mode is shown on the left hand side of FIG. 3 and is labeled as menu 305A. The menu in the touchscreen mode is shown on the right hand side of FIG. 3 and is labeled as menu 305B.

In an example, the menu 305A includes a visual indicator 330 indicating a location of a cursor. For example, the visual indicator 330 indicates the location of the cursor at content tile 332A. As the device receives navigation data, the visual indicator 330 moves locations accordingly. For example, a selection of a right navigation button moves the visual indicator 330 to content tile 332B. In an example, a different visual indicator 314A indicates the category that is selected. Generally, the GUI elements are presented in the menu 305A according to a predefined arrangement, such as a grid with predefined positions, and a predefined GUI elements order (e.g., most recently viewed movie row, suggested movie rows, etc.). The navigation follows the arrangement and order, whereby the visual indicator 330 is moved along the grid (from one position to a next adjacent position, and so forth). And if a content tile is not in view, that content tile can be moved to become in view at a position in the grid, where other control tiles that were in view may be relocated to other positions in the grid or moved out of view. For instance in a tile grid arrangement of rows and columns, the visual indicator 330 may be initially shown on a top, left tile that corresponds to a top, left position of the grid. Upon vertical, down navigation, the visual indicator 330 stays in the left column and moves from one row to the next. Conversely, upon horizontal, right navigation, the visual indicator 330 stays in the top row and moves from one column to the next. When the visual indicator 330 reaches a last tile that is in full view (e.g., bottom, left tile; bottom, right tile; or top, right tile), the next row and/or column tiles, as applicable, are moved into view and a row and/or column, as applicable, that was in view is no longer in view. In this way, in the remote control mode, the navigation can follow the tile grid arrangement by moving between adjacent positions within this arrangement, and the tiles also follow this arrangement by moving rows and columns of tiles in and out of the view.

In an example, during a power-on event of the device, the menu 305A is presented in the remote control mode. The visual indicator 330 is presented at a predefined location. For example, the visual indicator 330 may be presented at the left-most category identifier. When the visual indicator 330 is in the tab portion 312A, the different visual indicator 314A may not be presented.

In an example, when switching to the remote control mode from the touchscreen mode, the content tiles 332A-G are adjusted such that the content tiles 332A-G are presented in the predefined arrangement (e.g., the grid). For example, the positions of the content tiles 332A-G may be adjusted to fit the predefined positions of the grid. Additionally, when switching to the remote control mode from the touchscreen mode, the device determines a content tile that is presented in full view at a particular position in the grid (the top left content tile that is in full view, such as the content tile 332A in the illustration of FIG. 3). The visual indicator 330 is presented at the location of the content tile 332A based on the content tile 332A being in full view at the particular grid position.

In an example, the menu 305B in the touchscreen mode does not include a visual indicator indicating a location of a cursor. A different visual indicator 314B is presented in the tab portion 312B to indicate the category identifier that is selected. In the touchscreen mode, the navigation need not follow the predefined arrangement (e.g., the grid). In other words, touchscreen input can be received at any position on the menu 305B to trigger a relevant action (e.g., a tap on a content tile may open a page about the content tile; a gesture may result in a scroll, etc.). The navigation need not move from one grid position to a next adjacent one, but can directly depend on the touchscreen location. No cursor needs to be presented for the navigation. Further, the content tile can be moved (e.g., based on a touchscreen gesture) such that they may be positioned at locations that are different from the predefined grid positions.

In an example, when powering on the display 310 in response to a touchscreen input at the display 310, the menu 305B is presented in the touchscreen mode and the visual indicator is omitted.

In an example, the display 310 presents an overlay window 342. The overlay window 342 is presented over at least a portion of the menu 305B. One or more GUI buttons of the overlay window 342 correspond to one or more non-navigational buttons of the display remote control. For example, GUI buttons of the overlay window 342 can include a back button, a home button, a settings button, or a power button.

Figure 4:
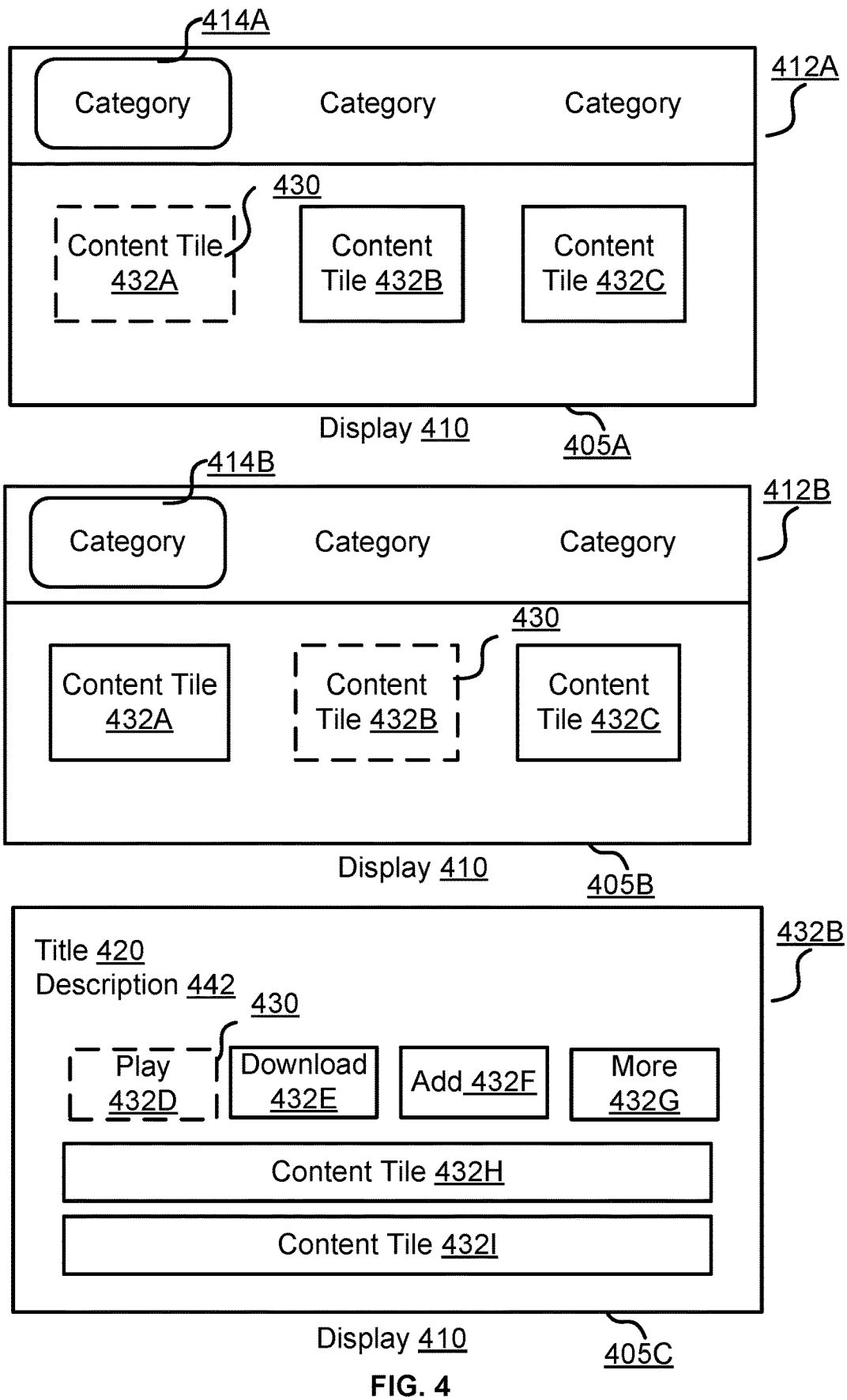
FIG. 4 illustrates an example of navigation in a remote control mode, according to embodiments of the present disclosure.

FIG. 4 illustrates an example of navigation in a remote control mode, according to embodiments of the present disclosure. A menu is presented on display 410 of a multi-input modality device. The menu 405A on the top of FIG. 4 corresponds to a selected category identifier, which is identified with a first visual indicator 414A in a tab portion 412A. Content tiles 432A-C are GUI elements associated with the selected category. For example, the menu 405A corresponds to a selected category of TV shows. Content tiles 432A-C are GUI elements that correspond to TV show options. The content tiles 432A-C may include titles and images corresponding to the TV show options.

In an example, a second visual indicator 430 is presented at a first location indicating a position of a cursor in the menu 405A. The first and second visual indicator 414 and 430 have different presentation styles such that a user can easily distinguish between a selection (as indicated by the visual indicator 414) and a cursor position (as indicated by the visual indicator 430). For instance, the visual indicator 414 may be a grey bounding box, whereas the visual indicator 430 may be an orange bounding box. Of course, other presentation styles can be used (other colors, lines, shadings, etc.). The second visual indicator 430 is located at content tile 432A, indicating the cursor is on content tile 432A. The device receives navigation data corresponding to a selection of a navigation button of a display remote control. For example, the navigation data corresponds to a selection of a right navigation button of the display remote control.

In an example, the menu 405B in the middle of FIG. 4 is shown on the display 410 after the device receives the navigation data. The second visual indicator 430 is presented at a second location associated with a second GUI element. For example, based on the selection of the right navigation button, the second visual indicator 430 is presented on content tile 432B, which is adjacent to the content tile 432A. The device receives selection data indicating a selection of the content tile 432B.

In the remote control mode, navigation is confined to the available navigation buttons of the display remote control. The content tiles 432A-C move in a predefined sequence (according to the predefined arrangement and predefined GUI elements order) based on navigation data. For example, the right navigation button may be pressed multiple times. If additional content options are available in the same row as content tiles 432A-C, once the second visual indicator 430 is on content tile 432C and additional navigation is received to move right, content tile 432A may move off the display 410 to the left and an additional content tile may be presented at a predefined position of the row. Additionally, in the remote control mode, selection data can only be received for the GUI element that the cursor is on.

In an example, a content tile page (also referred to as a details page) corresponding to the selection is presented. The menu 405C on the bottom of FIG. 4 is shown on the display 410 for the content tile page associated with the content tile 432B. The device determines the content tile page is presentable based on the selection data being received while the cursor is on the content tile 432B. The content tile page includes a title 420, a description 442, and GUI elements associated with the content. For example, the GUI elements include a play button 432D, a download button 432E, an add button 432F for adding the content to a watchlist, and a more button 432G to display more options. Additional or alternative GUI elements may be displayed in other examples. When the content tile page is presented, the second visual indicator 430 is initially presented at a predefined display position. For example, the predefined display position may be a top left GUI element, such as the play button 432D. The GUI elements also include content tiles 432H and 432I. The content tiles 432H and 432I may be GUI elements for selecting episodes of the content. The device may receive additional data to navigate to and select a content tile on the content tile page.

FIG. 5 illustrates an example of navigation in a touchscreen mode, according to embodiments of the present disclosure. A menu is presented on display 510 of a multi-input modality device. The menu 505A on top of FIG. 5 corresponds to a selected category identifier, which is identified with a first visual indicator 514 in a tab portion 512. No visual indicator is used to indicate a cursor position because, in the touchscreen mode, no cursor is used. Content tiles 532A-C are GUI elements associated with the selected category. For example, the menu 505A corresponds to a selected category identifier of TV shows. Content tiles 532A-C are GUI elements that correspond to TV show options. The content tiles 532A-C may include titles and images corresponding to the TV show options.

In an example, the device receives data corresponding to a menu scrolling or menu selection. For example, the data corresponds to a selection of the content tile 532C. A content tile page corresponding to the selection is presented. Menu 505B on the bottom of FIG. 5 is shown on the display 510 and includes the content tile page corresponding to the content tile 532C. The content tile page includes a title 520, a description 542, and GUI elements associated with the content. For example, the GUI elements include a play button 532D, a download button 532E, an add button 532F for adding the content to a watchlist, and a more button 532G to display more options. Additional or alternative GUI elements may be displayed in other examples. The GUI elements also include content tiles 532H and 532I. The content tiles 532H and 532I may be GUI elements for selecting episodes of the content. The device may receive additional data to navigate to and select a content tile on the content tile page.

In the touchscreen mode, navigation can include scrolling on the menu 505A. The content tiles 532A-C move in a fluid manner based on navigation. For example, the navigation can include a menu scroll in the left direction. If additional content options are available in the same row as content tiles 532A-C, the content tile 532A may move off the display 510 to the left and an additional content tile may be presented. The touchscreen mode can also support a presentation of a portion of a GUI element, as opposed to a full view of the GUI element. Additionally, in the touchscreen mode, selection data can be received for any GUI element displayed on the menus 505A and 505B.

Figure 6:
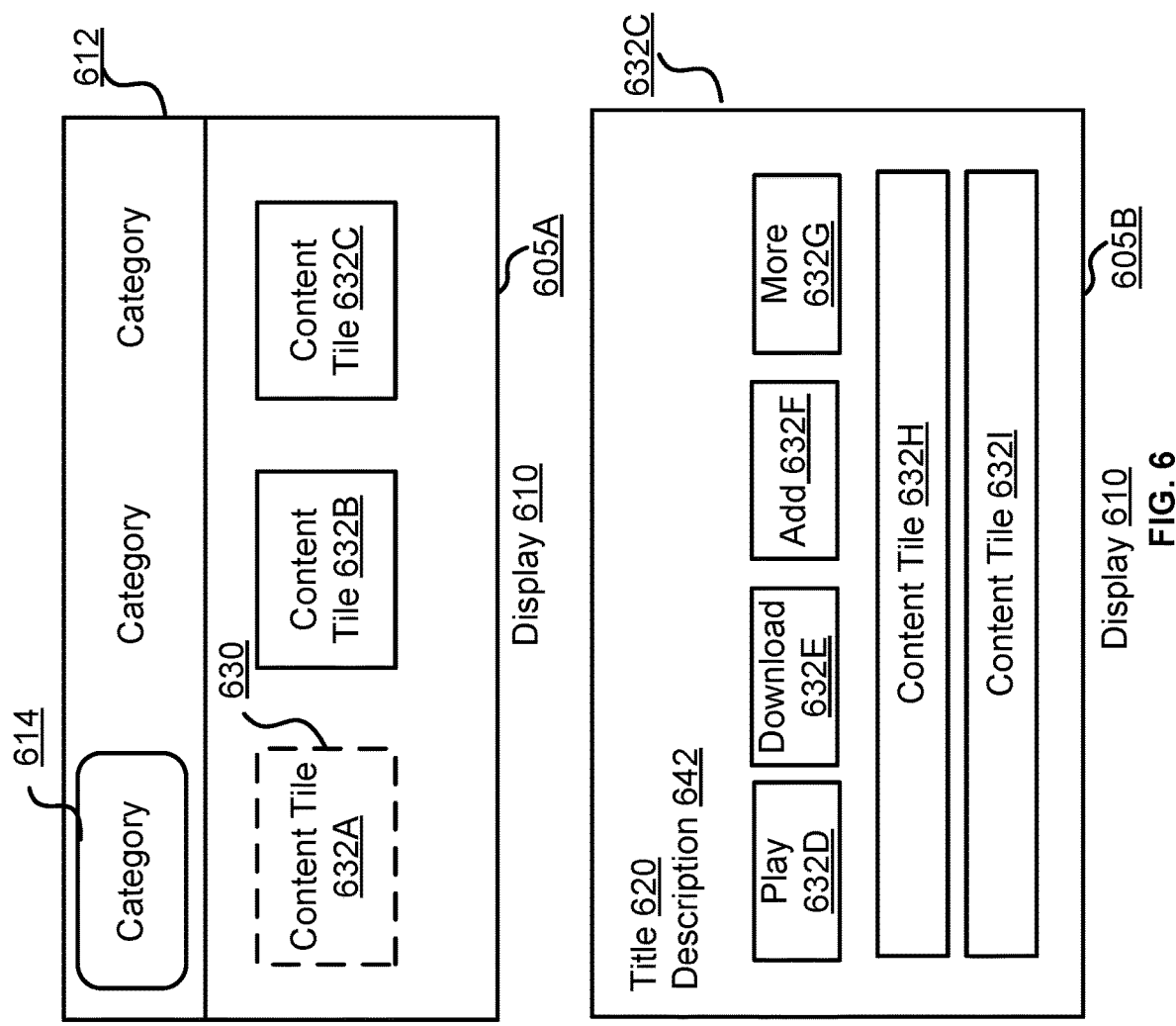
FIG. 6 illustrates an example of a transition of a display between input modalities, according to embodiments of the present disclosure.

FIG. 6 illustrates an example of a transition of a display between input modalities, according to embodiments of the present disclosure. A menu 605A shown on a display 610 shows an example of a device in a remote control mode that corresponds to a remote control input modality. A menu 605B shown on the display 610 shows an example of the device in a touchscreen mode that corresponds to a touchscreen input modality.

In an example, the menu 605A corresponds to the menu 405A of FIG. 4. The menu 605A corresponds to a selected category identifier, which is identified with a first visual indicator 614 in a tab portion 612. Content tiles 632A-C are GUI elements associated with the selected category. For example, the menu 605A corresponds to a selected category of TV shows. The content tiles 632A-C are GUI elements that correspond to TV show options. The content tiles 632A-C may include titles and images corresponding to the TV show options. A second visual indicator 630 is presented at a first location indicating a position of a cursor. The second visual indicator 630 is located at content tile 632A, indicating the cursor is on content tile 632A.

In an example, the device receives touchscreen input. The second visual indicator 630 is removed based on the touchscreen input. The device receives a second touchscreen input of a selection at the GUI element of the content tile 632C. A content tile page associated with the content tile 632C is presented, shown as the menu 605B and does not include a visual indicator for a cursor. The menu 605B can correspond to the menu 505B of FIG. 5. The menu 605B shows the content tile page corresponding to the content tile 632C. The content tile page includes a title 620, a description 642, and GUI elements associated with the content. For example, the GUI elements include a play button 632D, a download button 632E, an add button 632F for adding the content to a watchlist, and a more button 632G to display more options. Additional or alternative GUI elements may be displayed in other examples. The GUI elements also include content tiles 632H and 632I. The content tiles 632H and 632I may be GUI elements for selecting episodes of the content.

Although not shown in FIG. 6, an overlay window, such as the overlay window 342 of FIG. 3, may additionally be presented based on the touchscreen input.

Figure 7:
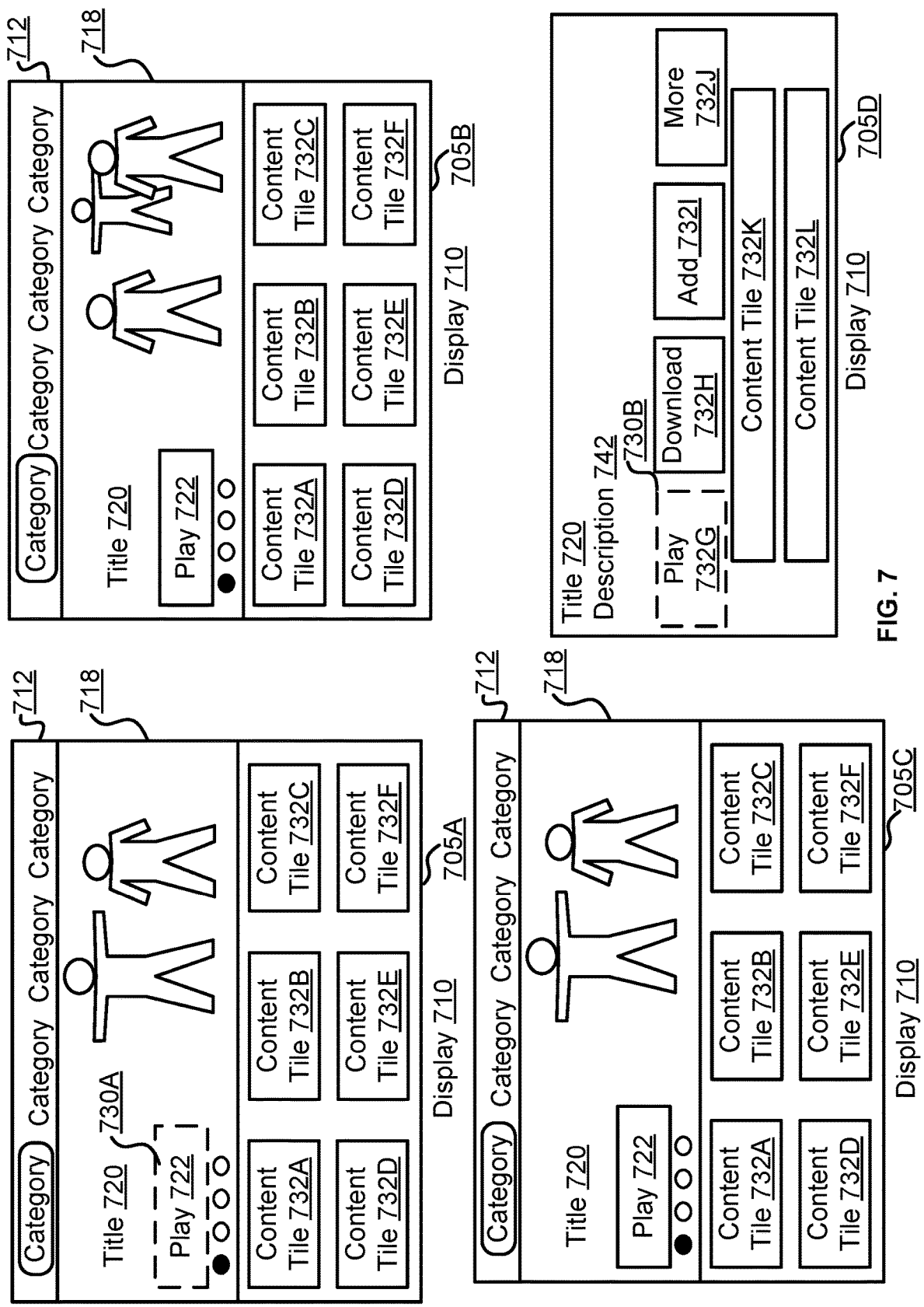
FIG. 7 illustrates an example of a preview portion of a menu, according to embodiments of the present disclosure.

FIG. 7 illustrates an example of a preview portion 718 of a menu, according to embodiments of the present disclosure. A menu 705A, shown in the top left of FIG. 7, shows an example of the menu 305A, where a menu is presented on a display 710 in a remote control mode. The menu 705A includes a tab portion 712 and the preview portion 718.

In an example, a visual indicator 730 is presented at a GUI element in the preview portion 718 to indicate a cursor position. For example, the visual indicator 730 is presented at a play button 722 of the preview portion 718. The visual indicator 730 is presented in a first presentation style (e.g., a highlight). The device determines that a predefined amount of time (e.g., five seconds) elapsed since a start of the presentation of the first GUI element and the visual indicator. The device presents a content preview in the preview portion 718 based on the predefined amount of time elapsing. For example, the content preview is a trailer for a movie. The device changes the presentation of the visual indicator 730 to a second presentation style (e.g., transparent highlight) while the content preview is presented. The menu 705B, shown in the top right of FIG. 7, is shown on the display 710 while the content preview is presented.

In an example, while the device presents the content preview in the preview portion 718, the device receives a touchscreen input. The device stops the presentation of the content preview based on the touchscreen input. Additionally, the visual indicator 730 is removed after receiving the touchscreen input. The menu 705C, shown in the bottom left of FIG. 7, shows the menu after the device receives the touchscreen input.

In an example, the device receives a second touchscreen input of a selection of the play button 722. The device presents a content tile page associated with the content of the content preview, which is shown as menu 705D in the bottom right of FIG. 5. The menu 705D is an example of the menu 505B of FIG. 5.

Figure 8:
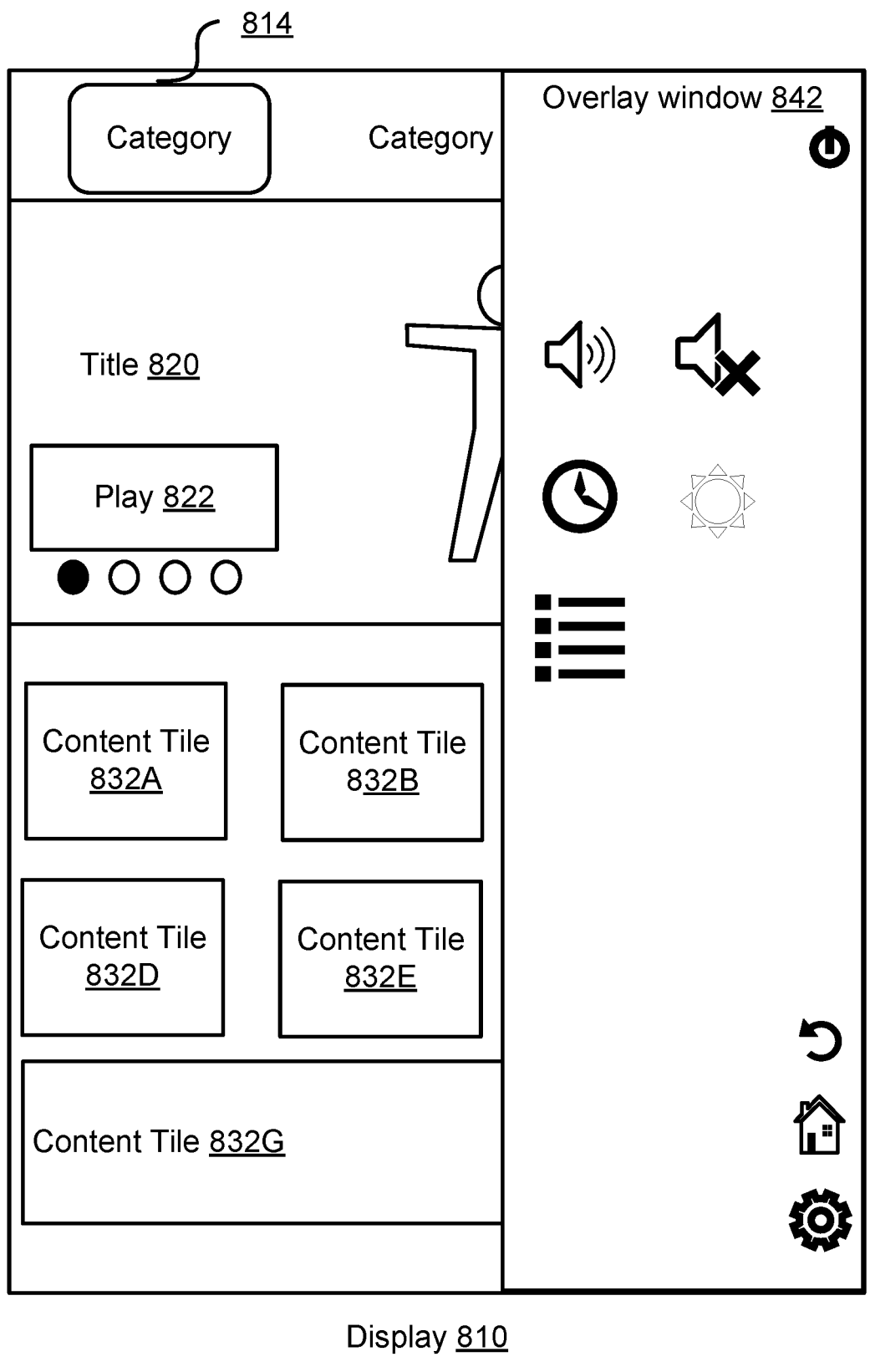
FIG. 8 illustrates an example of an overlay window of a multi-input modality device, according to embodiments of the present disclosure.

FIG. 8 illustrates an example of an overlay window 842 of a multi-input modality device, according to embodiments of the present disclosure. In a touchscreen mode, a display 810 shows different menu elements, similar to the menu 305B of FIG. 3. Visual indicator 814, title 820, and play button 822, and content tiles 832A-G are examples of the corresponding components in FIG. 3. Generally, a remote control can include navigation button (e.g., operable to navigate through a menu) and non-navigational buttons (e.g., to control aspects of the device, such as power ON/OFF, volume, etc. and aspects of content presented, such as play, pause, etc.). In the touchscreen mode, the remote control is no longer usable given that the touchscreen mode and the remote control mode are exclusive of each other. In the touchscreen mode, touchscreen input can be received to control the menu navigation. To provide the non-navigation functionalities, the menu can also include the overlay window 842 that includes GUI buttons corresponding to the non-navigation buttons of the remote control and selectable via touchscreen input. In this way, the non-navigational functionalities are replicated in the touchscreen mode. The overlay window 842 may persist in the touchscreen mode until content is presented or the device switches to the remote control mode at which point the overlay window 842 is dismissed.

In an example, the overlay window 842 is initially collapsed to show GUI buttons corresponding to the non-navigational buttons of the remote control. For example, the GUI buttons include a power button, a back button, a home button, and a settings button. The device receives a selection of a GUI button, such as the settings button, and the presentation of the overlay window 842 expands over a portion of the menu to present additional GUI buttons associated with the selection. In FIG. 8, the additional GUI buttons are illustrated as volume buttons, a clock button, a brightness button, and a menu button for additional options.

Figure 9:
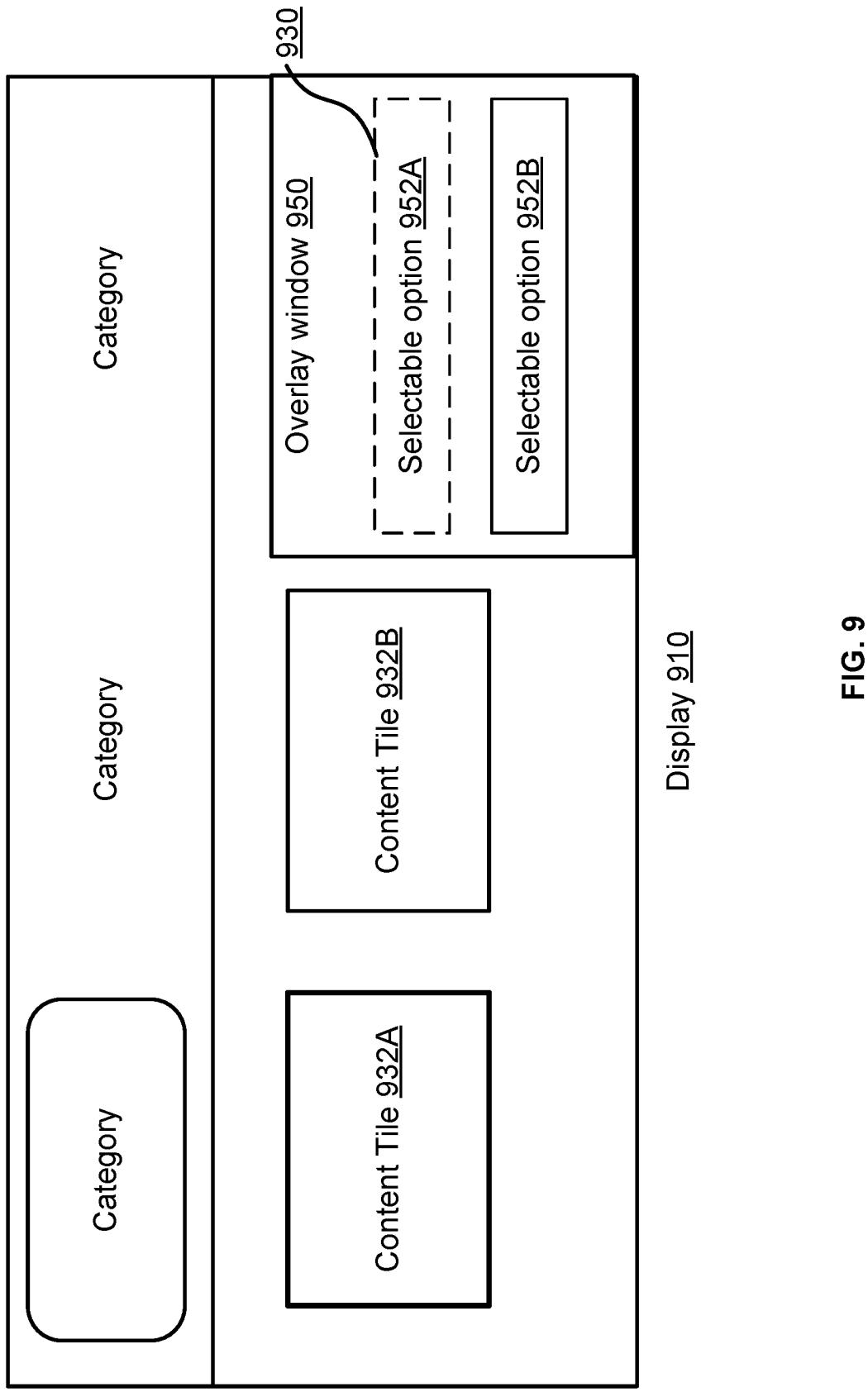
FIG. 9 illustrates an example of an overlay window in a remote control mode, according to embodiments of the present disclosure.

FIG. 9 illustrates an example of an overlay window 950 in a remote control mode, according to embodiments of the present disclosure. The overlay window 950 includes options related to a GUI element presented in a menu, such as options related to a content tile. A display 910 of a device shows the menu with a tab portion and body portion, as illustrated in FIG. 2. The overlay window 950 is presented over a portion of the menu based on an input from a display remote control. For example, selection of an option button on the display remote control while a cursor is on content tile 932A presents the overlay window 950. The overlay window 950 includes selectable options 952A and 952B associated with the content tile 932A. Examples of selectable options include resume, watch from beginning, add to watchlist, remove from recent, and the like. A visual indicator 930 indicates that a cursor is on the selectable option 952A. A different visual indicator may be presented on the content tile 932A to indicate the overlay window 950 is associated with the content tile 932A. In FIG. 9, the different visual indicator is shown as a bold border, although other presentation styles are possible.

In an example, before the overlay window 950 is presented, the content tile 932A is positioned such that the overlay window 950 would overlap the content tile 932 if the overlay window 950 were to be presented. In such examples, the device repositions the content tile 932A, and optionally other content tiles, such that the content tile 932A is presented at a non-overlapping position with the overlay window 950 when the input is received from the display remote control.

Figure 10:
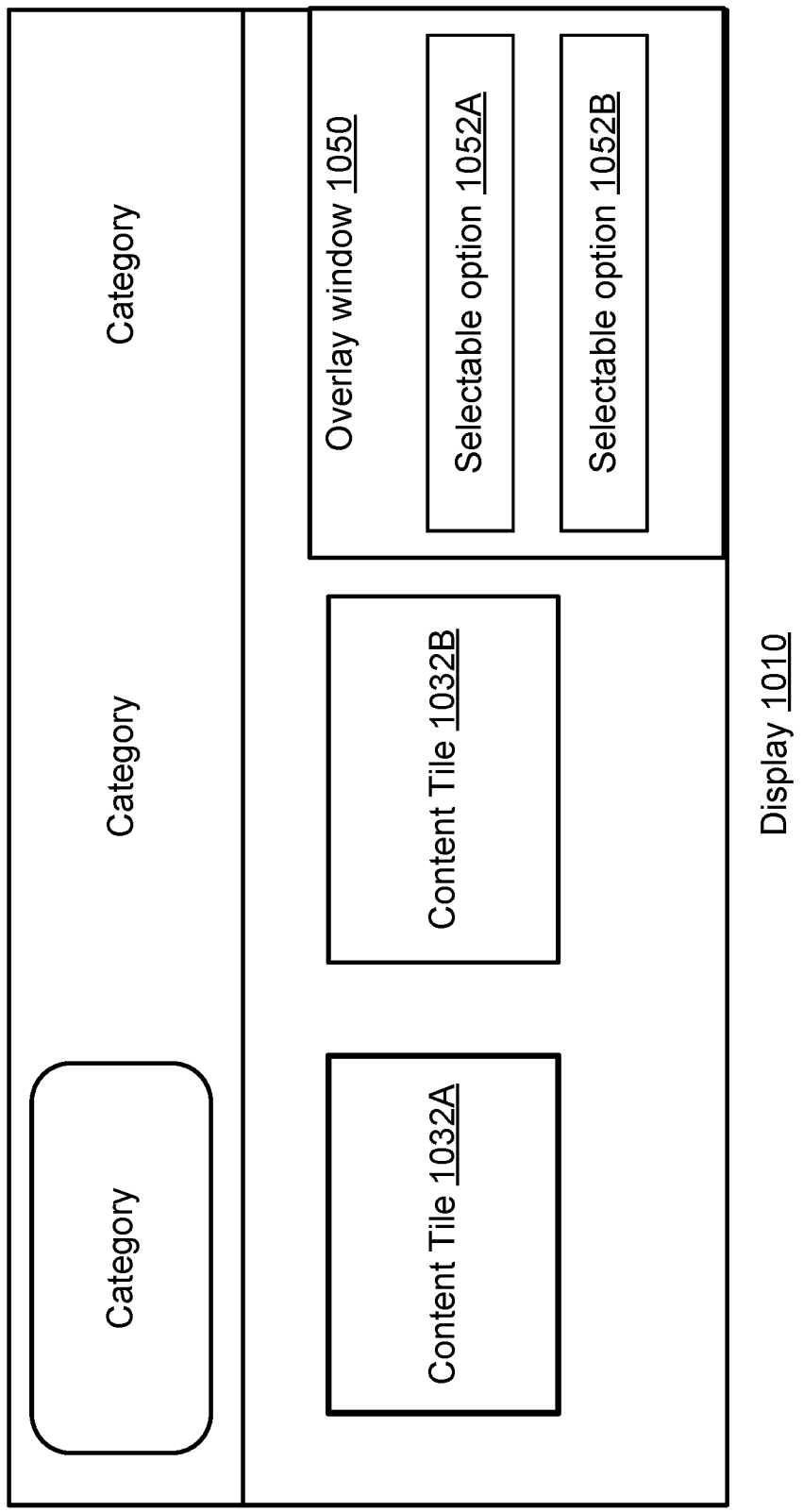
FIG. 10 illustrates an example of an overlay window in a touchscreen mode, according to embodiments of the present disclosure.

FIG. 10 illustrates an example of an overlay window 1050 in a touchscreen mode, according to embodiments of the present disclosure. Here also, the overlay window 1050 includes options related to a GUI element presented in a menu, such as options related to a content tile. A display 1010 of a device shows the menu with a tab portion and body portion, as illustrated in FIG. 2. The overlay window 1050 is presented over a portion of the menu based on a predefined touchscreen input. For example, the predefined touchscreen input is a press and hold action on a GUI element. The device presents the overlay window 1050 when the content tile 1032A is pressed and held. The overlay window 1050 includes selectable options 1052A and 1052B associated with the content tile 1032A. Examples of selectable options include resume, watch from beginning, add to watchlist, remove from recent, and the like. The device does not present a visual indicator on a selectable option in the touchscreen mode. However, a visual indicator may be presented on the content tile 1032A to indicate the overlay window 1050 is associated with the content tile 1032A. In FIG. 10, the visual indicator is shown as a bold border, although other presentation styles are possible.

In an example, before the overlay window 1050 is presented, the content tile 1032A is positioned such that the overlay window 1050 would overlap the content tile 1032 if the overlay window 1050 were to be presented. In such examples, the device repositions the content tile 1032A, and optionally other content tiles, such that the content tile 1032A is presented the content tile 1032A at a non-overlapping position with the overlay window 1050 when the touchscreen input is received.

Figure 11:
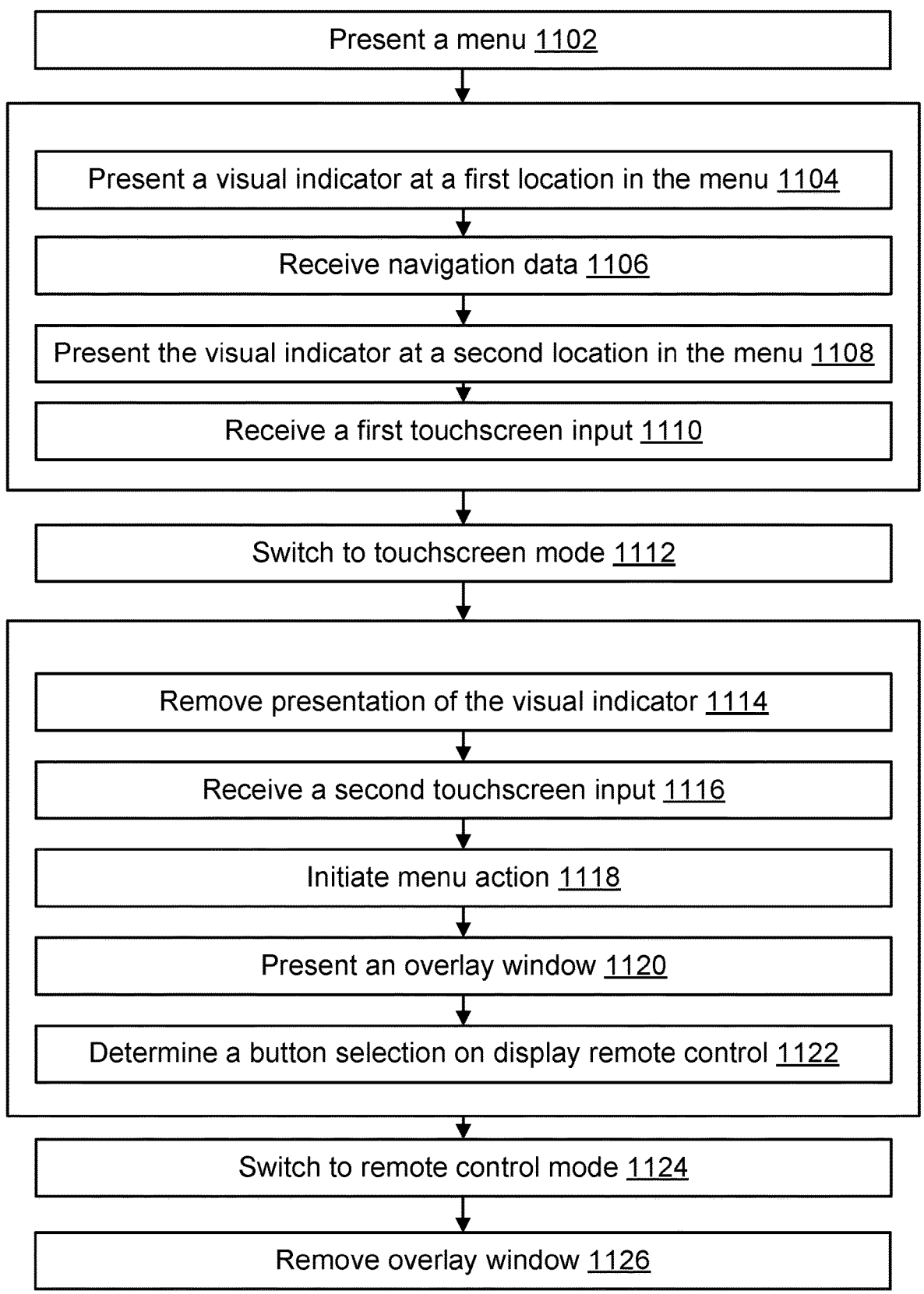
FIG. 11 illustrates an example of a flow for controlling an interface of a multi-input modality device, according to embodiments of the present disclosure.

FIG. 11 illustrates an example of a flow for controlling an interface of a multi-input modality device, according to embodiments of the present disclosure. Operations of the flow can be performed by a device with a display, such as the display 110. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the device.

The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered. In the interest of brevity, two modes are described in the flow: a remote control mode and a touchscreen mode. However, the flow similarly apply to additional or other types of input modalities including, for instance, speech input modality.

In an example, the flow includes operation 1102, where the device presents a menu. The menu is presented on a touchscreen display. The menu includes multiple GUI elements. Exemplary GUI elements are shown in the previously described figures.

In an example, the flow includes operation 1104, where the device, while in a remote control mode, presents a visual indicator at a first location in the menu. The visual indicator is associated with a first GUI element of the GUI elements and indicates a cursor is on the first GUI element.

In an example, the flow includes operation 1106, where the device receives navigation data. The navigation data corresponds to a selection of a navigation button of a display remote control. For example, the navigation button may correspond to a directional selection of left, right, up, or down.

In an example, the flow includes operation 1108, where the device presents the visual indicator at a second location in the menu. The second location is associated with a second GUI element of the GUI elements and is adjacent to the first GUI element. The visual indicator indicates that the cursor is on the second GUI element in response to the selection of the navigation button.

In an example, the flow includes operation 1110, where the device receives a first touchscreen input. The first touchscreen input is received at the touchscreen display.

In an example, the flow includes operation 1112, where the device switches to a touchscreen mode. The touchscreen mode and the remote control mode are exclusive to each other. For instance, the controls of the menu can be carried at any point in time in the remote control mode or the touchscreen mode, but not simultaneously in both modes. The applicable mode depends on the type of input (e.g., when in the remote control mode, and upon receiving touchscreen input, the device switches to the touchscreen mode; conversely, when in the touchscreen mode, and upon receiving a remote control input, the device switches to the remote control mode). The touchscreen mode corresponds to a touchscreen input modality and the remote control mode corresponds to a display remote control input modality.

In an example, the flow includes operation 1114, where the device removes the presentation of the visual indicator. A different visual indicator may be presented in a tab portion of the menu not to indicate a cursor position but to indicate a selected category identifier.

In an example, the flow includes operation 1116, where the device receives a second touchscreen input. The second touchscreen input corresponds to a menu action that includes at least one of a menu scrolling or a menu selection.

In an example, the flow includes operation 1118, where the device initiates a menu action. The menu action corresponds to the second touchscreen input of the menu scrolling and/or menu selection.

In an example, the flow includes operation 1120, where the device presents an overlay window. The overlay window is presented over a portion of the menu. The overlay window includes a GUI button that corresponds to an additional button of the display remote control.

In an example, the flow includes operation 1122, where the device determines a button selection on the display remote control. The button selection corresponds to a remote control input modality.

In an example, the flow includes operation 1124, where the device switches to the remote control mode. The device switches to the remote control mode based on the device determining the button selection on the display remote control.

In an example, the flow includes operation 1126, where the device removes the overlay window. The device additionally adjusts a positioning of the GUI elements, such that the GUI elements are presented in an arrangement that has a predefined position. The device also presents the visual indicator at a predefined location (e.g., top left GUI element) within the arrangement to indicate a cursor position.

Figure 12:
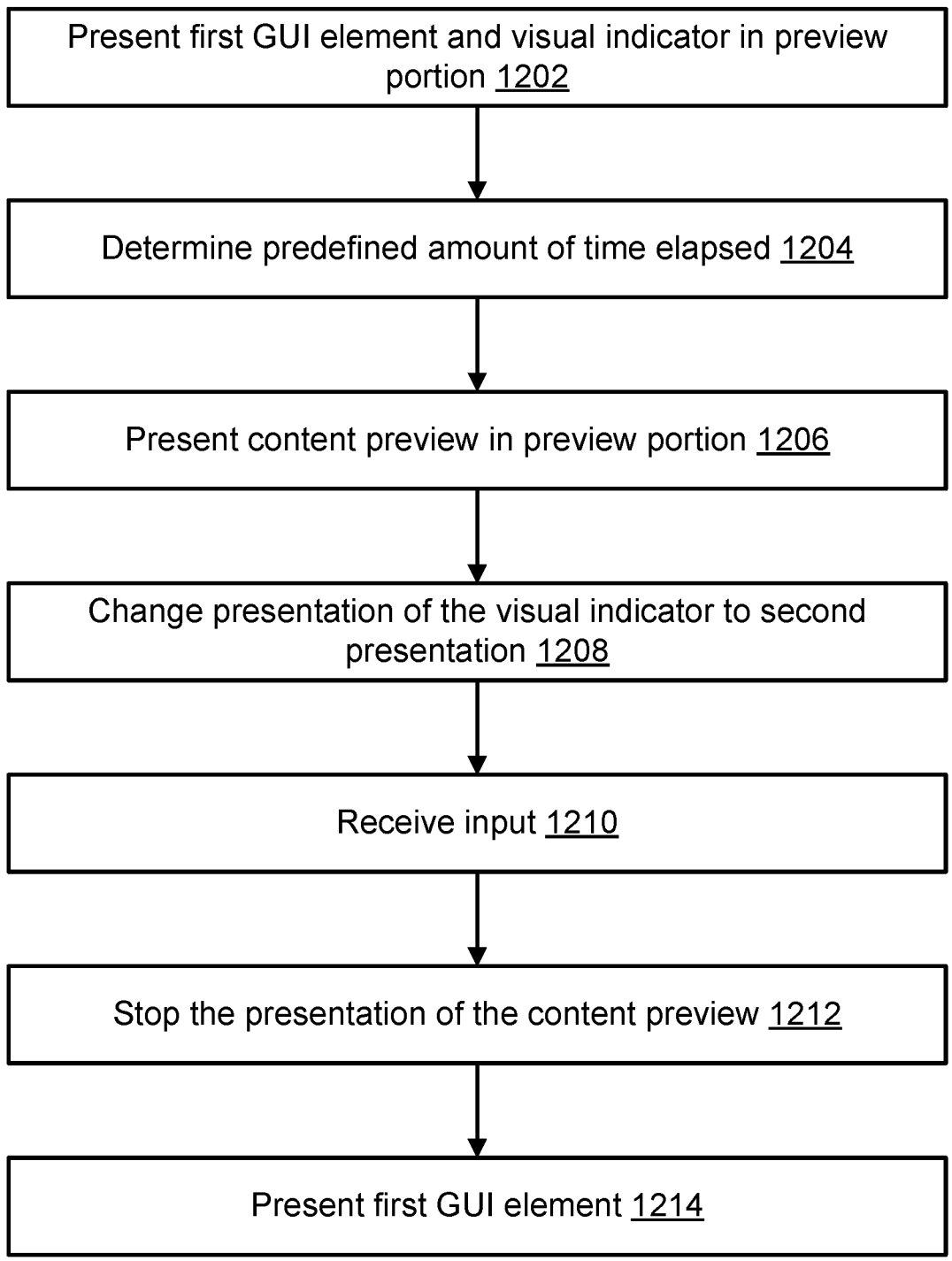
FIG. 12 illustrates an example of a flow for a preview portion of a multi-input modality device, according to embodiments of the present disclosure.

FIG. 12 illustrates an example of a flow for a preview portion of a multi-input modality device, according to embodiments of the present disclosure. Operations of the flow can be performed by a device with a display, such as the display 110. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1202, where the device presents a first GUI element and a visual indicator in a preview portion. The first GUI element is an image of featured content. The visual indicator is presented in a first presentation style (e.g., a highlight). An example of the presentation is shown in FIG. 7.

In an example, the flow includes operation 1204, where the device determines a predefined amount of time elapsed. The predefined amount of time is a time since a start of the presentation of the first GUI element and the visual indicator. For example, the predefined amount of time is five seconds.

In an example, the flow includes operation 1206, where the device presents a content preview in the preview portion. The content preview is presented based at least in part on the predefined amount of time. The content preview may correspond to a trailer for the featured content.

In an example, the flow includes operation 1208, where the device changes the presentation of the visual indicator to a second presentation style. The second presentation style is presented while the content preview is presented. In an example, the second presentation style may be a faded version of the first presentation style.

In an example, the flow includes operation 1210, where the device receives an input. The input corresponds to a touchscreen input modality and is received while the content preview is presented. Receiving the input switches the device to a touchscreen mode.

In an example, the flow includes operation 1212, where the device stops the presentation of the content preview. The presentation is stopped based at least in part on the input. An example of stopping the presentation of the content preview is shown in FIG. 7B.

In an example, the flow includes operation 1214, where the device presents the first GUI element. The presentation of the visual indicator is removed based on the input.

Figure 13:
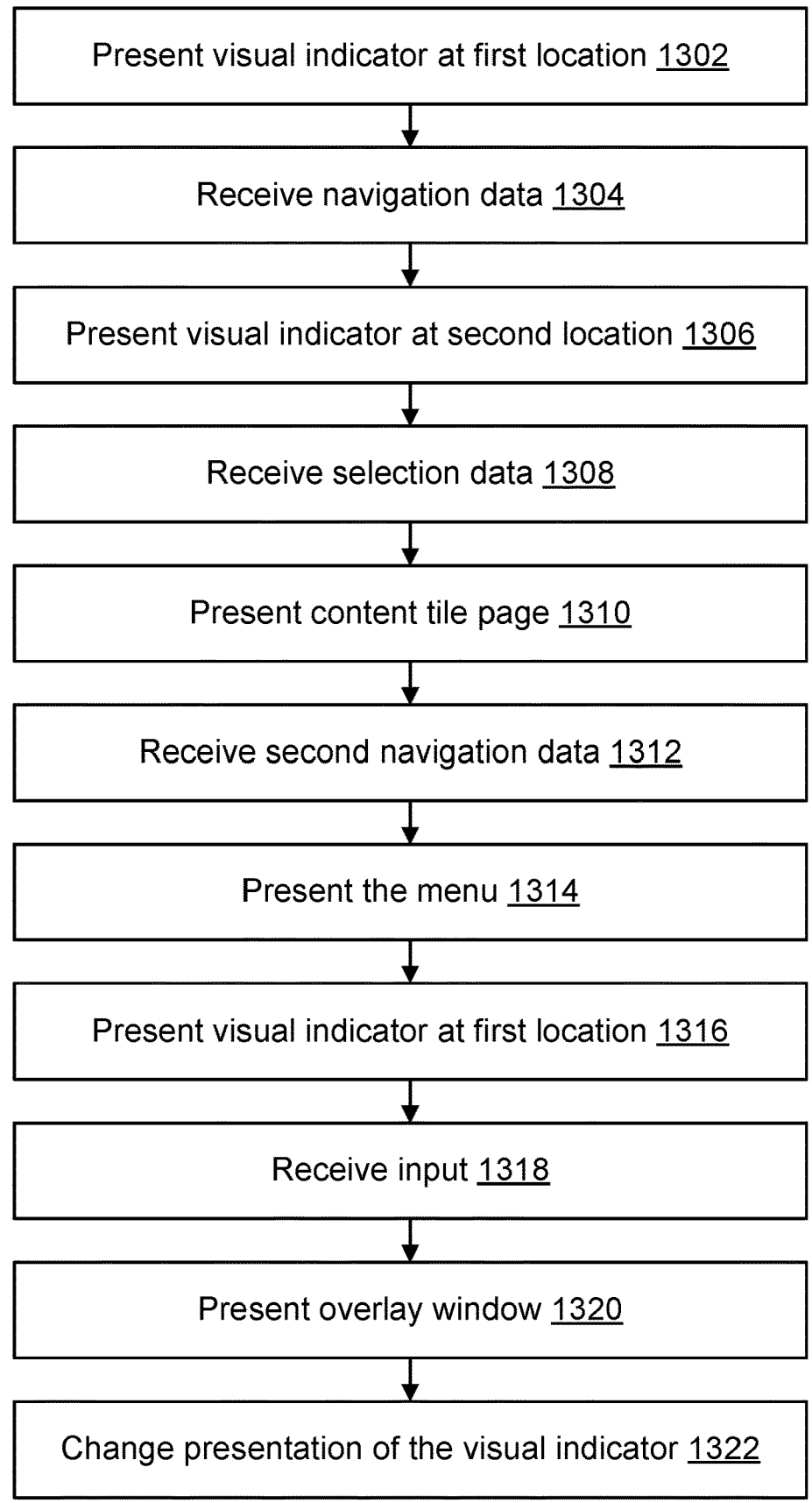
FIG. 13 illustrates an example of a flow for navigation in a remote control mode, according to embodiments of the present disclosure.

FIG. 13 illustrates an example of a flow for navigation in a remote control mode, according to embodiments of the present disclosure. Operations of the flow can be performed by a device with a display, such as the display 110. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1302, where the device presents a visual indicator at a first location. The visual indicator at the first location indicates a cursor is on a first GUI element in a menu. The visual indicator 430 in display 410A of FIG. 4 shows the visual indicator at a first location.

In an example, the flow includes operation 1304, where the device receives navigation data. The navigation data corresponds to a selection of a navigation button of a display remote control. For example, the navigation data corresponds to a selection of a right button of the display remote control.

In an example, the flow includes operation 1306, where the device presents the visual indicator at a second location. The visual indicator is presented at the second location based on the navigation data. The second location is associated with a second GUI element that is adjacent to the first GUI element. The visual indicator indicates the cursor is on the second GUI element. The visual indicator 430 in the display 410B of FIG. 4 shows the visual indicator at a second location.

In an example, the flow includes operation 1308, where the device receives selection data. The selection data indicates a selection of the second GUI element via the display remote control.

In an example, the flow includes operation 1310, where the device presents a content tile page. The content tile page is associated with the second GUI element and is presentable based at least in part on the device receiving the selection data while the cursor is on the second GUI element. The display 410C of FIG. 4 shows a content tile page associated with a GUI element.

In an example, the flow includes operation 1312, where the device receives second navigation data. The second navigation data corresponds to a selection of a back button on the display remote control.

In an example, the flow includes operation 1314, where the device presents the menu. The menu includes the first and second GUI elements.

In an example, the flow includes operation 1316, where the device presents the visual indicator at the first location. The visual indicator indicates the cursor is on the first GUI element.

In an example, the flow includes operation 1318, where the device receives input. The input is received from the display remote control while the visual indicator is on the first GUI element and corresponds to a selection of an option button.

In an example, the flow includes operation 1320, where the device present an overlay window. The overlay window is presented over at least a portion of the menu and the overlay window includes a selectable option associated with the first GUI element. FIG. 9 shows an example of the overlay window presented in the remote control mode.

In an example, the flow includes operation 1322, where the device changes the presentation of the visual indicator. The presentation of the visual indicator is changed to indicate that a cursor is on the selectable option.

Figure 14:
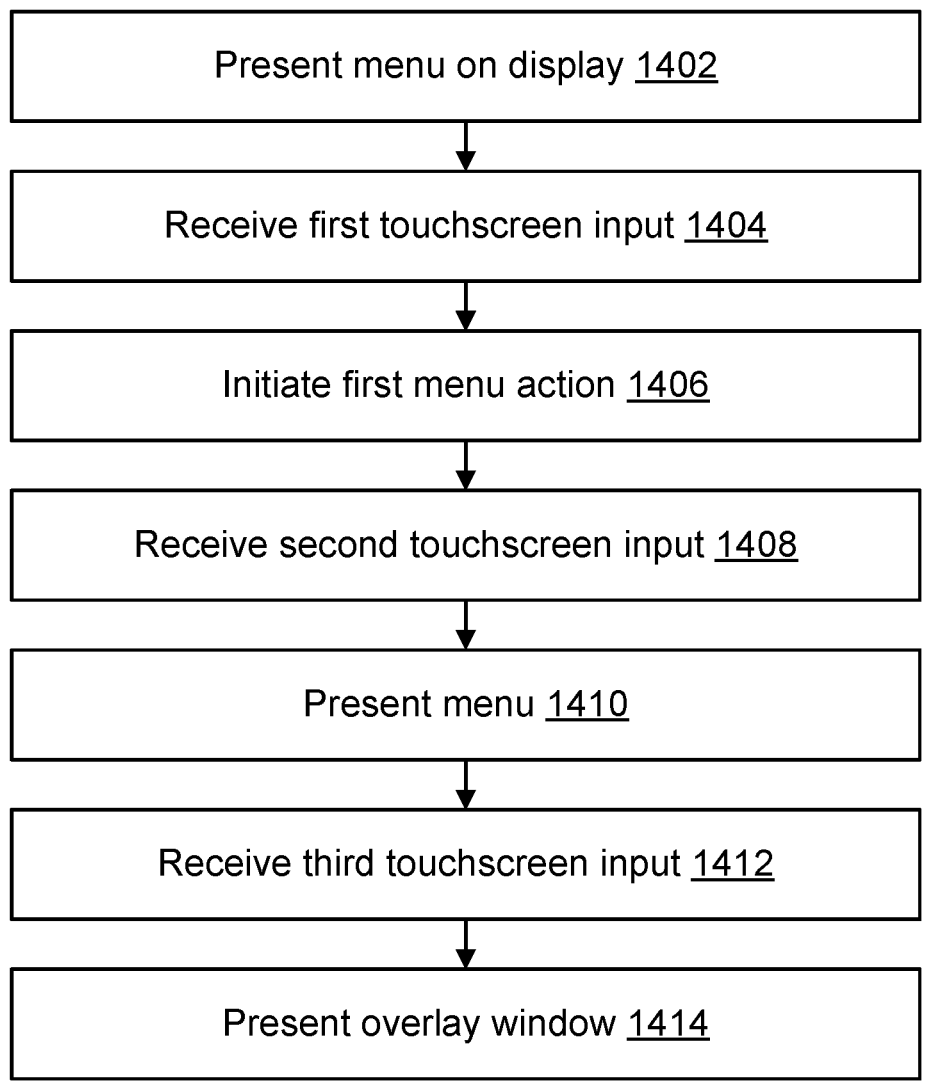
FIG. 14 illustrates an example of a flow for navigation in a touchscreen mode, according to embodiments of the present disclosure.

FIG. 14 illustrates an example of a flow for navigation in a touchscreen mode, according to embodiments of the present disclosure. Operations of the flow can be performed by a device with a display, such as the display 110. Some or all of the instructions for performing the operations can be implemented as hardware circuitry and/or stored as computer-readable instructions on a non-transitory computer-readable medium of device. As implemented, the instructions represent modules that include circuitry or code executable by processor(s) of the device. The use of such instructions configures the device to perform the specific operations described herein. Each circuitry or code in combination with the relevant processor(s) represent a means for performing a respective operation(s). While the operations are illustrated in a particular order, it should be understood that no particular order is necessary and that one or more operations may be omitted, skipped, performed in parallel, and/or reordered.

In an example, the flow includes operation 1402, where the device presents a menu on a display. The device is in a touchscreen mode. The menu includes GUI elements associated with a selected category identifier. No visual indicator is presented to indicate a cursor position in the menu.

In an example, the flow includes operation 1404, where the device receives a first touchscreen input. The first touchscreen input is a selection of a GUI element. The first selection input can be received at any position of the menu.

In an example, the flow includes operation 1406, where the device initiates a first menu action. The first menu action depends on the type of the first touchscreen input (e.g., a touchscreen tap to select a GUI element, a touchscreen gesture for a menu scroll, etc.). In an illustration, the first menu action causes the device to present a content tile page associated with the selected GUI element based on the first touchscreen input. FIG. 5 shows an example of a content tile page in the touchscreen mode.

In an example, the flow includes operation 1408, where the device receives a second touchscreen input. The second touchscreen input corresponds to a selection of a GUI button for returning to the menu. The GUI button may be in an overlay window on the display.

In an example, the flow includes operation 1410, where the device presents the menu. The menu includes the GUI element along with additional GUI elements.

In an example, the flow includes operation 1412, where the device receives a third touchscreen input. The third touchscreen input corresponds to a predefined touchscreen input for accessing an overlay window associated with the GUI element, where the overlay window shows selectable options related to the GUI element.

In an example, the flow includes operation 1414, where the device presents the overlay window. The overlay window is presented over at least a portion of the menu and the overlay window includes the selectable options. No visual indicator for a cursor is presented in the overlay window. FIG. 10 shows an example of the overlay window presented in the remote control mode.

Figure 15:
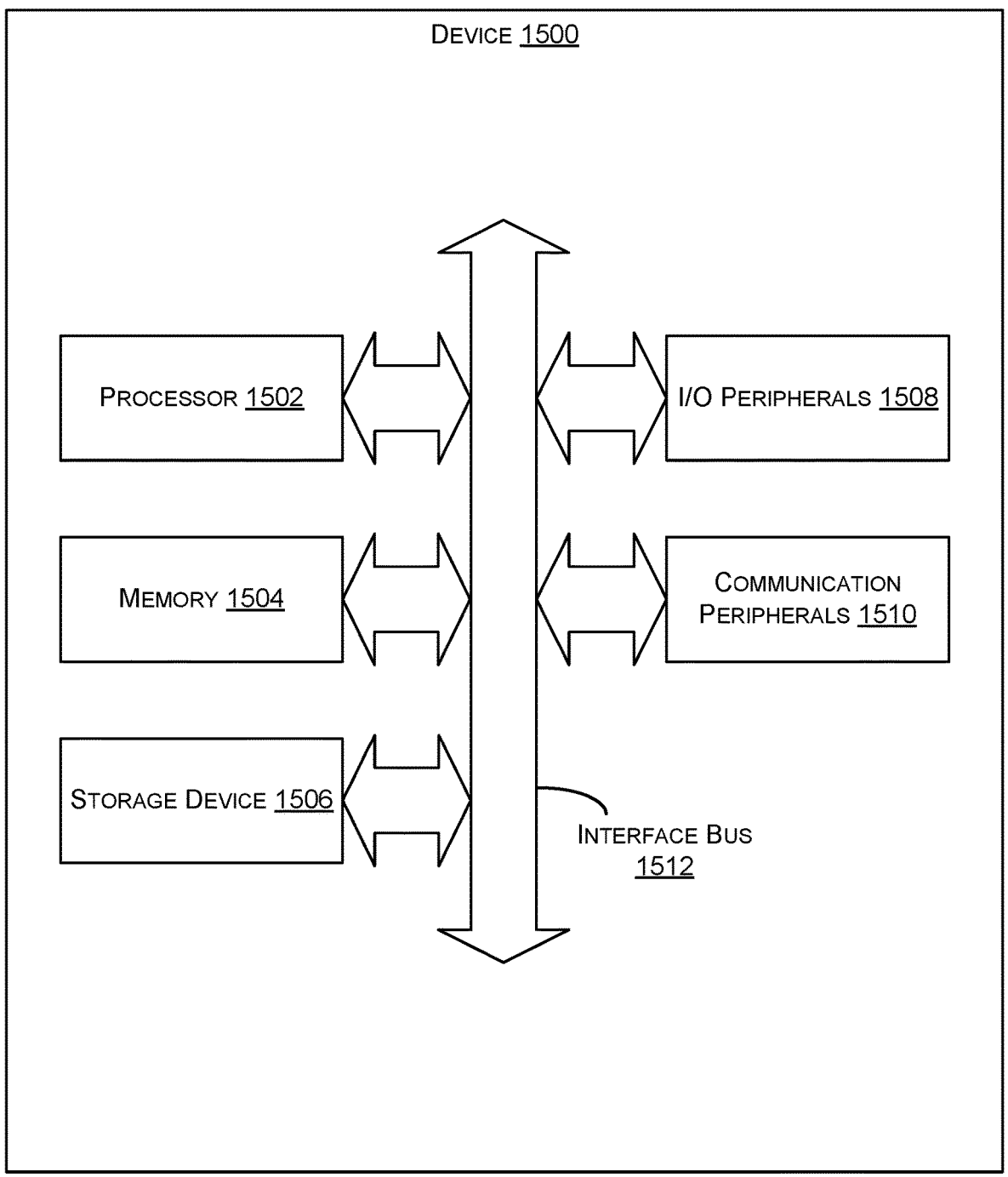
FIG. 15 an example of components of a device for performing methods described herein, according to at least one example.

FIG. 15 illustrates an example of components of a device that can be used to perform the methods described herein, according to embodiments of the present disclosure. Although the components of the device 1500 are illustrated as belonging to a same device 1500, the device 1500 can also be distributed (e.g., between multiple subsystems of a computer system).

The device 1500 includes at least a processor 1502, a memory 1504, a storage device 1506, input/output peripherals (I/O) 1508, communication peripherals 1510, and an interface bus 1512. The interface bus 1512 is configured to communicate, transmit, and transfer data, controls, and commands among the various components of the device 1500. The memory 1504 and the storage device 1506 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1504 and the storage device 1506 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the device 1500.

Further, the memory 1504 includes an operating system, programs, and applications. The processor 1502 is configured to execute the stored instructions and includes, for example, a logical processing unit, a microprocessor, a digital signal processor, and other processors. The memory 1504 and/or the processor 1502 can be virtualized and can be hosted within another device of, for example, a cloud network or a data center. The I/O peripherals 1508 include user interfaces, such as a keyboard, a display (e.g., a touchscreen), a remote control, a microphone, a speaker, other input/output devices, and computing components, such as graphical processing units, serial ports, parallel ports, universal serial buses, and other input/output peripherals. The I/O peripherals 1508 are connected to the processor 1502 through any of the ports coupled to the interface bus 1512. The communication peripherals 1510 are configured to facilitate communication between the device 1500 and other computing devices over a communications network and include, for example, a network interface controller, modem, wireless and wired interface cards, antenna, and other communication peripherals.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
    a touchscreen display;
    a display remote control that comprises navigation buttons;

a processor; and a memory storing computer-readable instructions associated with controlling menu navigation in a plurality of input modality modes that include a remote control mode and a touchscreen mode, the computer-readable instructions upon execution by the processor cause the system to:

present a menu on the touchscreen display, the menu showing an arrangement of a plurality of graphical user interface (GUI) elements;

while in the remote control mode:

present, in the menu while the menu shows the arrangement, a visual indicator at a first location associated with a first GUI element of the plurality of GUI elements, the visual indicator indicating that a cursor is on the first GUI element, receive navigation data corresponding to a selection of a navigation button of the display remote control, present, in the menu, the visual indicator at a second location associated with a second GUI element of the plurality of GUI elements, the second GUI element being adjacent to the first GUI element, the visual indicator indicating that the cursor is on the second GUI element in response to the selection of the navigation button, and receive a first touchscreen input at the touchscreen display;

switch to the touchscreen mode, the remote control mode and the touchscreen mode being exclusive to each other; and while in the touchscreen mode:

continue presenting the menu by at least showing the plurality of GUI elements in the arrangement;

based at least in part on the switching to the touchscreen mode, remove the presentation of the visual indicator from the menu and present another visual indicator in the menu at a third location, the third location being independent of a location of the first touchscreen input, receive a second touchscreen input at the touchscreen display, the second touchscreen input corresponding to a menu action that includes at least one of: a menu scrolling or a menu selection, and initiate the menu action.

2. The system of claim 1, wherein the display remote control further comprises an additional button, wherein the memory stores further computer-readable instructions that, upon execution by the processor, cause the system to:

while in the touchscreen mode:

present an overlay window over a portion of the menu, the overlay window comprising a GUI button that corresponds to the additional button, determine a button selection on the display remote control, and switch to the remote control mode; and while in the remote control mode:

remove the presentation of the overlay window.

3. The system of claim 1, wherein the memory stores further computer-readable instructions that, upon execution by the processor, cause the system to:

while in the touchscreen mode:

determine a button selection on the display remote control, and switch to the remote control mode; and while in the remote control mode:

adjust a positioning of the plurality of GUI elements such that the arrangement is presented at a predefined position, and present, in the menu, the visual indicator at a predefined location within the arrangement, the visual indicator indicating that the cursor is on a third GUI element of the plurality of GUI elements.

4. A method implemented on a device, the method comprising:

presenting, in a first input modality mode of the device, a menu on a display, the menu showing an arrangement of a plurality of graphical user interface (GUI) elements, the first input modality mode corresponding to a first type of input modality;

receiving a first input corresponding to a second type of input modality;

switching to a second input modality mode based at least in part on the first input, the second input modality mode corresponding to the second type of input modality, the first input modality mode and the second input modality mode being exclusive to each other and each providing a different menu navigation control;

presenting, in the second input modality mode of the device, the menu on the display by at least showing the plurality of GUI elements in the arrangement; and changing, based at least in part on the switching to the second input modality mode, a presentation in the menu of a visual indicator at a first location associated with a first GUI element of the plurality of GUI elements.

5. The method of claim 4, further comprising:

presenting, in the first input modality mode corresponding to a remote control input modality, the visual indicator at the first location indicating that a cursor is on the first GUI element;

receiving navigation data corresponding to a selection of a navigation button of a display remote control; and presenting, in the first input modality mode and based at least in part on the navigation data, the visual indicator at a second location associated with a second GUI element of the plurality of GUI elements, the second GUI element being adjacent to the first GUI element, the visual indicator indicating that the cursor is on the second GUI element, wherein changing the presenting of the visual indicator comprises removing the presentation of the visual indicator.

6. The method of claim 5, further comprising:

receiving selection data indicating a selection of the second GUI element via the display remote control; and presenting, based at least in part on the first input modality mode, a menu page associated with the second GUI element, wherein the first input modality mode indicates that the menu page is presentable based at least in part on receiving the selection data while the cursor is on the second GUI element, and wherein the second input modality mode indicates that the menu page is presentable based at least in part on a selection of the second GUI element via the second type of input modality and absent the cursor being on the second GUI element.

7. The method of claim 4, wherein receiving the first input comprises receiving data corresponding to a selection of a button of a remote control, wherein changing the presentation of the visual indicator presenting, in the second input modality mode corresponding to a remote control input modality, the visual indicator at the first location, and wherein the method further comprises:

receiving a second input corresponding to a touchscreen selection on the display; and removing the presentation of the visual indicator from the menu in the first input modality mode that corresponds to a touchscreen input modality.

8. The method of claim 4, further comprising:

presenting, in the first input modality mode, an overlay window over at least a portion of the menu, the overlay window comprising a GUI button corresponding to a button of a display remote control; and removing, in the second input modality mode corresponding to a remote control input modality, the presentation of the overlay window.

9. The method of claim 4, further comprising:

determining that the first GUI element is presented in full view; and determining that the first location corresponds to a predefined display position, wherein changing the presentation of the visual indicator comprises presenting the visual indicator at the first location based at least in part on the first GUI element being located at the predefined display position.

10. The method of claim 4, further comprising:

receiving, in the first input modality mode corresponding to a touchscreen input modality, touchscreen input associated with moving the first GUI element to a second location;

presenting the first GUI element at the second location, wherein receiving the first input comprises receiving, after the first GUI element is presented at the second location, data corresponding to a selection of a button of a display remote control;

determining that the arrangement is to be presented at a predefined position in the second input modality mode; and presenting, in the second input modality mode, the first GUI element at the first location based at least in part on the arrangement.

11. The method of claim 4, further comprising:

supplying an amount of power to the display based at least in part on a power-on event that comprises a boot-up of the device or a selection of a power on button via a display remote control, wherein the menu is presented in the first input modality mode based at least in part on the power-on event; and presenting, in the first input modality mode corresponding to a remote control input modality, the visual indicator at the first location.

12. The method of claim 4, further comprising:

supplying an amount of power to the display based at least in part on a power-on event that comprises a touchscreen input at the display, wherein the menu is presented in the first input modality mode based at least in part on the power-on event, and wherein the presentation of the visual indicator is omitted in the first input modality mode that corresponds to a touchscreen input modality.

13. A device comprising:

a processor; and a memory storing computer-readable instructions that, upon execution by the processor, cause the device to:

present, in a first input modality mode of the device, a menu on a display, the menu showing an arrangement of a plurality of graphical user interface (GUI) elements, the first input modality mode corresponding to a first type of input modality;

receive a first input corresponding to a second type of input modality;

switch to a second input modality mode based at least in part on the first input, the second input modality mode corresponding to the second type of input modality, the first input modality mode and the second input modality mode being exclusive to each other and each providing a different menu navigation control;

present, in the second input modality mode of the device, the menu on the display by at least showing the plurality of GUI elements in the arrangement; and change, based at least in part on the switching to the second input modality mode, a presentation in the menu of a visual indicator at a first location associated with a first GUI element of the plurality of GUI elements.

14. The device of claim 13, wherein the first input modality mode comprises at least one of a remote control input modality mode or a speech input modality mode, wherein the second input modality mode corresponds to a touchscreen input modality mode, and wherein changing the presentation of the visual indicator comprises removing the presentation of the visual indicator in the touchscreen input modality mode.

15. The device of claim 13, wherein the first input modality mode is a remote control input modality mode, wherein the menu comprises a tab portion and a body portion, wherein the memory stores further computer-readable instructions that, upon execution by the processor, cause the device to:

present, in the remote control input modality mode, a category identifier in the tab portion;

present the visual indicator at a location associated with the category identifier, the visual indicator indicating that a cursor is on the category identifier;

receive a second input indicating a selection of the category identifier via a display remote control;

present, based at least in part on the second input, a different visual indicator at the location indicating that the category identifier is selected;

present the plurality of GUI elements in the body portion, the plurality of GUI elements being associated with a category identified by the category identifier; and present the visual indicator at the location associated with the first GUI element, the visual indicator indicating that the cursor is on the first GUI element, wherein changing the presentation of the visual indicator comprises removing the presentation of the visual indicator in the second input modality mode while the presentation of the different visual indicator persists.

16. The device of claim 13, wherein the first input modality mode is a touchscreen input modality mode, wherein the menu comprises a tab portion and a body portion, wherein the memory stores further computer-readable instructions that, upon execution by the processor, cause the device to:

present, in the touchscreen input modality mode, a category identifier in the tab portion;

receive touchscreen input indicating a selection of the category identifier;

present, based at least in part on the touchscreen input, a different visual indicator at a location associated with the category identifier, the different visual indicator indicating that the category identifier is selected; and present the plurality of GUI elements in the body portion, the plurality of GUI elements being associated with a category identified by the category identifier, wherein changing the presentation of the visual indicator comprises presenting the visual indicator in the second input modality mode while the presentation of the different visual indicator persists.

17. The device of claim 13, wherein the menu comprises a preview portion, wherein the memory stores further computer-readable instructions that, upon execution by the processor, cause the device to:

present, in the first input modality mode, the first GUI element and the visual indicator in the preview portion, the visual indicator presented in a first presentation style;

determine that a predefined amount of time elapsed since a start of the presentation of the first GUI element and the visual indicator;

present, based at least in part on the predefined amount of time, a content preview in the preview portion; and change the presentation of the visual indicator to a second presentation style while the content preview is presented.

18. The device of claim 17, wherein the first input is received while the content preview is presented, and wherein the memory stores additional computer-readable instructions that, upon execution by the processor, cause the device to:

stop the presentation of the content preview based at least in part on the first input; and present, in the second input modality mode, the first GUI element, wherein changing the presentation of the visual indicator at the first location comprises removing the visual indicator.

19. The device of claim 13, wherein the memory stores further computer-readable instructions that, upon execution by the processor, cause the device to:

present, in the first input modality mode or the second input modality mode, an overlay window over at least a portion of the menu, wherein the overlay window comprises a selectable option associated with the first GUI element, wherein:

in the first input modality mode, the presentation of the visual indicator is changed to indicate that a cursor is on the selectable option, and in the second input modality mode, the presentation of the visual indicator is removed.

20. The device of claim 13, wherein the memory stores further computer-readable instructions that, upon execution by the processor, cause the device to:

present, in the first input modality mode or the second input modality mode, an overlay window over at least a portion of the menu, wherein the overlay window comprises a selectable option associated with the first GUI element;

present the first GUI element at a non-overlapping position with the overlay window; and change the presentation of the visual indicator to being presented according to a presentation style at a second location associated with the non-overlapping position.

* * * * *